United States Patent
Werris

(10) Patent No.: US 10,839,013 B1
(45) Date of Patent: Nov. 17, 2020

(54) GENERATING A GRAPHICAL REPRESENTATION OF RELATIONSHIPS AMONG A SET OF ARTICLES AND INFORMATION ASSOCIATED WITH THE SET OF ARTICLES

(71) Applicant: Facebook, Inc., Menlo Park, CA (US)

(72) Inventor: Ian Werris, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 331 days.

(21) Appl. No.: 15/976,040

(22) Filed: May 10, 2018

(51) Int. Cl.
 *G06F 16/901* (2019.01)
 *G06F 16/9038* (2019.01)
 *G06F 16/903* (2019.01)

(52) U.S. Cl.
 CPC ...... *G06F 16/9024* (2019.01); *G06F 16/9038* (2019.01); *G06F 16/90348* (2019.01)

(58) Field of Classification Search
 CPC ............. G06F 16/9024; G06F 16/9038; G06F 16/90348
 USPC .................................................. 707/791, 798
 See application file for complete search history.

(56) References Cited

U.S. PATENT DOCUMENTS

| | | | | |
|---|---|---|---|---|
| 10,489,473 B2* | 11/2019 | Allen | ..................... | G06F 40/186 |
| 2003/0130894 A1* | 7/2003 | Huettner | ............ | G06Q 30/0269 705/14.55 |
| 2007/0185904 A1* | 8/2007 | Matsuzawa | ......... | G06F 16/9024 |
| 2009/0083261 A1* | 3/2009 | Nagano | ................. | G06F 16/951 |
| 2013/0073632 A1* | 3/2013 | Fedorov | ................. | G06Q 50/01 709/205 |
| 2016/0224547 A1* | 8/2016 | Agrawal | ................. | G06F 16/93 |
| 2017/0078413 A1* | 3/2017 | Chi | ......................... | G06Q 30/02 |
| 2018/0121603 A1* | 5/2018 | Devarakonda | ......... | G16H 50/20 |
| 2018/0239959 A1* | 8/2018 | Bui | ....................... | G06F 16/345 |
| 2019/0251150 A1* | 8/2019 | Vinay | ...................... | G06F 8/38 |
| 2019/0354544 A1* | 11/2019 | Hertz | ...................... | G06N 5/02 |

* cited by examiner

*Primary Examiner* — James Trujillo
*Assistant Examiner* — Fariborz Khoshnoodi
(74) *Attorney, Agent, or Firm* — Fenwick & West LLP

(57) ABSTRACT

An online system identifies articles containing factual reporting and information associated with the articles (e.g., authors, publishers, distributors, content, etc.). The online system extracts embeddings for the articles based on the information associated with the articles and generates nodes of a graph, in which each node corresponds to an article or information associated with an article. The online system then identifies relationships among the nodes using the embeddings and generates additional nodes of the graph indicating these relationships. Each of the additional nodes may correspond to any type of information that may be associated with an article. The online system may query the graph for information identifying publishers that published articles alleging a fact, information identifying articles containing editorialized content or clickbait, etc. or to identify and remove similar articles from a feed to be presented to an online system user, to highlight contradicting articles in the feed, etc.

23 Claims, 3 Drawing Sheets

GENERATING A GRAPHICAL REPRESENTATION OF RELATIONSHIPS AMONG A SET OF ARTICLES AND INFORMATION ASSOCIATED WITH THE SET OF ARTICLES

BACKGROUND

This disclosure relates generally to online systems, and more specifically to generating a graphical representation of relationships among a set of articles and information associated with the set of articles.

Information containing factual reporting (e.g., news articles) may be communicated in various ways. Traditionally, this information has been communicated using conventional mass communication channels. For example, reports about a particular news story may be broadcast via radio and television while articles about the news story may be published in periodicals such as newspapers and magazines. As an additional example, television news channels, radio news stations, and newspaper and magazine publishers often have websites that may be used to present news stories. However, information containing factual reporting is increasingly being created by non-traditional entities and circulated via non-traditional media. For example, individuals and organizations may create and publish blogs, page posts, and multimedia messages containing factual reporting to promote their opinions or causes. Furthermore, because of the popularity of online systems that allow their users to share content (e.g., social networking systems), information containing factual reporting is often shared and re-shared among online system users, allowing it to be disseminated at a faster rate than ever before.

Although the increasing number of means by which information may be created and communicated has improved the availability of information, it has also generated vast amounts of data, making it more difficult to search for relevant information about any factual reporting in an efficient manner. For example, an individual who wants to be informed about new developments in a particular news story may have to search through several reports (e.g., television broadcasts, online news articles, etc.) about the news story in order to determine whether any new developments have occurred. In this example, the individual may waste a lot of time searching through reports that repeat the same information and reports that may be irrelevant (e.g., reports about tangential issues, editorial articles about the story indicating opinions or beliefs of the authors, etc.).

Furthermore, since virtually anyone may create and distribute information containing factual reporting, it may be difficult to determine whether the information is inaccurate, misleading, or inappropriate. For example, while moderators for online discussion forums may monitor the forums and remove offensive content (e.g., hate speech or explicit language), it may be difficult, if not impossible for them to verify the accuracy of each statement posted by users of the discussion forums. As an additional example, articles containing clickbait (e.g., eye-catching headlines that exaggerate or sensationalize news events) may have to be flagged by users of an online system before they are removed or blocked by the online system. While the trustworthiness of information containing factual reporting may be determined based on the source of the information (e.g., information attributable to large news organizations and prominent journalists may be regarded as more trustworthy than other information), it may be difficult to attribute the source of the information (e.g., if it has been re-shared multiple times). Therefore, determining the trustworthiness of information containing factual reporting may be a very time-consuming and complicated task, especially if the information is communicated via a variety of media. Moreover, because of the vast amounts of data available, it may be difficult to quickly search through the data (e.g., for information about a particular fact or issue).

SUMMARY

Conventionally, information containing factual reporting may be exchanged via a variety of media, such as radio, television, newspapers, the Internet, etc. However, the vast amount of information that is generated is often repetitive, which may make the process of searching through the information time-consuming, especially if only a particular item of factual reporting is being sought. Furthermore, it may be difficult to determine the trustworthiness of the information. Without a centralized collection of information containing factual reporting and information describing relationships among the information, it may be difficult to perform searches associated with the information in an efficient manner.

Therefore, to facilitate the performance of searches associated with information containing factual reporting, an online system generates a graph of articles (e.g., news articles) and information associated with the articles (e.g., authors, publishers, distributors, content, etc.) that may be queried for various types of information. To generate the graph, the online system identifies articles containing factual reporting and information associated with the articles and extracts embeddings for the articles based on the information associated with the articles. The online system then generates nodes of a graph, in which each node corresponds to an article or information associated with an article. The online system identifies relationships among the nodes using the embeddings and generates additional nodes of the graph indicating these relationships. Each of the additional nodes may correspond to any type of information that may be associated with an article (e.g., a fact).

Furthermore, once the graph is generated, the online system may query the graph based on requests received from users of the online system. The online system may query the graph for various types of information (e.g., information identifying articles that are likely to be trustworthy, information identifying publishers that published articles alleging a fact, information identifying articles containing editorialized content or clickbait, etc.). Additionally, the online system may query the graph to perform various actions (e.g., to identify and remove similar articles from a feed to be presented to an online system user, to highlight contradicting articles in the feed, etc.).

In some embodiments, the content of the articles may be expressed in formats including text, audio, video, images, etc. In embodiments in which the content of an article identified by the online system is expressed in a format other than text, the online system may identify the article with the aid of various types of technology and/or interpretation methods (e.g., automatic transcription, facial recognition technology, etc.).

In various embodiments, the graph generated by the online system may be a hierarchical graph containing multiple levels of nodes. In such embodiments, different levels may correspond to different categories that may be associated with the articles (e.g., articles, stories, comprehensive stories, etc.), in which the levels are arranged in order of increasing specificity.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
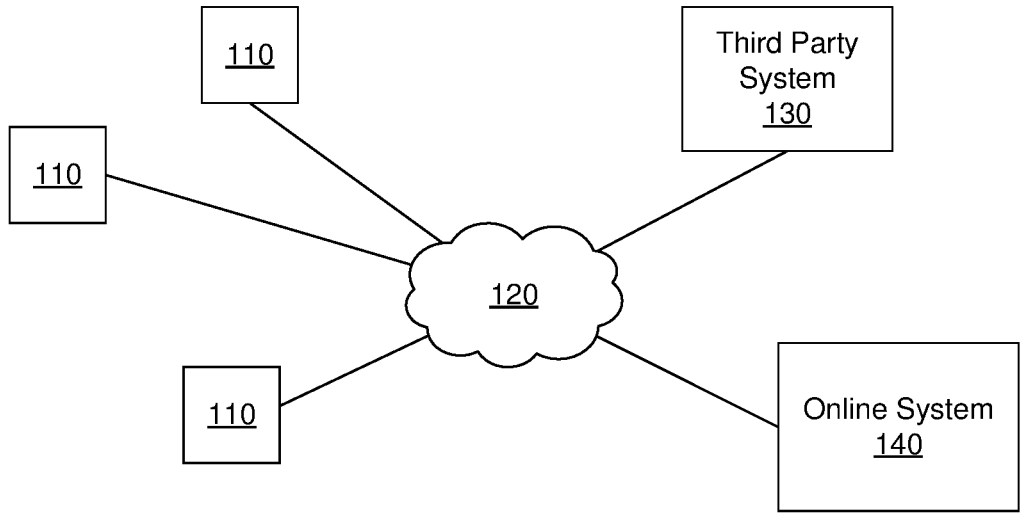
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
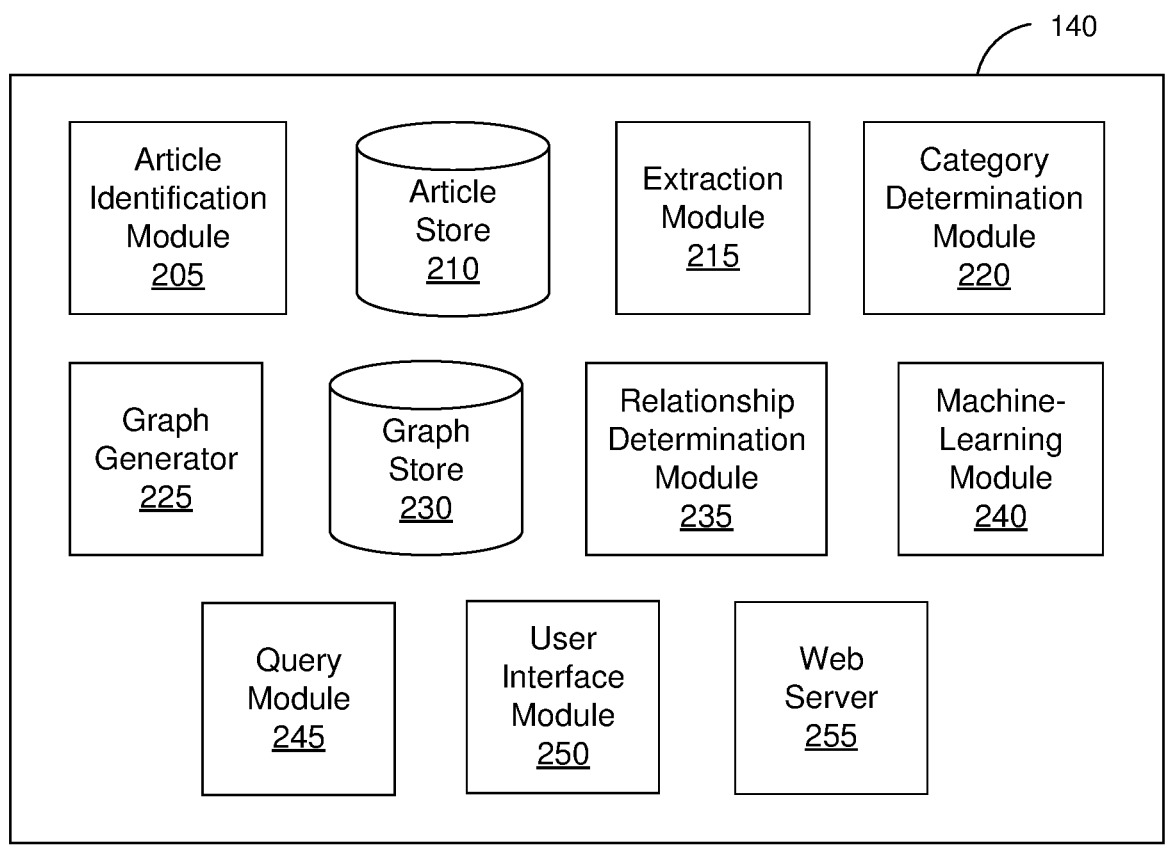
FIG. 2 is a block diagram of an online system, in accordance with an embodiment.

FIG. 2 is a block diagram of an architecture of the online system 140. The online system 140 shown in FIG. 2 includes an article identification module 205, an article store 210, an extraction module 215, a category determination module 220, a graph generator 225, a graph store 230, a relationship determination module 235, a machine-learning module 240, a query module 245, a user interface module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

The article identification module 205 identifies (e.g., as shown in step 305 of FIG. 3) articles containing factual reporting (i.e., articles asserting or otherwise associated with one or more facts). In some embodiments, the article identification module 205 may identify factual reporting contained in articles using one or more machine-learning models. For example, the article identification module 205 may parse the content of an article, identify keywords, phrases, and/or contextual information included in the article, and provide the keywords/phrases and contextual information to a machine-learning model. In this example, the machine-learning model may be trained to predict a likelihood that the article contains factual reporting based on a training set of articles, some of which contain factual reporting and some of which do not. Continuing with this example, the machine-learning model may output a predicted likelihood that the article contains factual reporting. In the above example, the article identification module 205 may identify the article as an article that contains factual reporting if the predicted likelihood is at least a threshold likelihood.

The content of articles identified by the article identification module 205 may be expressed in formats including text, audio, video, images, etc. and communicated via various types of media (e.g., newspapers, magazines, radio, television, the Internet, etc.). In embodiments in which the content of an article identified by the article identification module 205 is expressed in a format other than text, the article identification module 205 may identify the article with the aid of various types of technology and/or interpretation methods. For example, if the content of an article is communicated via radio or video (e.g., an interview that is broadcast over a television or radio station), the article identification module 205 may identify the article based on facts contained in a transcript of the audio or video content. In the above example, the article identification module 205 may generate the transcript with the aid of automatic transcription (e.g., automatic closed captions), lip reading technology, etc. As an additional example, if the content of an article includes an image of a person, the person may be identified by the article identification module 205 using facial recognition technology.

The article identification module 205 also identifies (e.g., as shown in step 305 of FIG. 3) information associated with articles, such as their authors, publishers, distributors, titles (e.g., headlines), etc. For example, if the content of an article is broadcast over radio or television, the article may be associated with a television channel or a radio station that distributed the content. As an additional example, an article may be associated with a source from which its content was obtained, such as eye-witnesses or other subjects of the article, printed sources (e.g., printed magazines or newspapers), digital sources (e.g., websites for cable news television channels), etc.

Information associated with an article identified by the article identification module 205 also may be associated with the content of the article. Examples of such information include one or more topics of an article, (e.g., an event and a politician) and/or one or more subjects described in the article, such as an entity (e.g., a person or a corporation), an object (e.g., an animate or inanimate object), a location (e.g. a restaurant or a country), and/or a time associated with the article (e.g., a publication or broadcast time or a time of a press conference that is the subject of the article). An article also may be associated with facts, such as facts alleged by the article or associated with its publication/delivery (e.g., "breaking news" or "live coverage"). Additionally, an article also may be associated with a sentiment polarity (e.g., a positive, negative, or neutral sentiment of an author of the article or an entity described in the article).

In addition to the types of information described above, the article identification module 205 also may identify additional types of information associated with articles. In various embodiments, an article may be associated with different versions (e.g., original and redacted versions). Different versions of an article may be tracked by the article identification module 205 (e.g., using edition or version numbers, timestamps, etc.). An article also may be associated with one or more stories. For example, multiple articles may cover the same story, which in turn covers a portion of a more comprehensive story. In this example, each of the articles is associated with the story as well as the more comprehensive story, which may be identified by the article identification module 205.

The article identification module 205 may identify information associated with articles using various techniques. For example, the article identification module 205 may identify an author of an article by identifying keywords or phrases included in the article that often precede a name of an author (e.g., "written by" or "author:"). As an additional example, if the content of an article is communicated via video, the article identification module 205 may identify an entity associated with the article using a combination of lip reading technology to determine that a person is speaking in the video and facial recognition technology to identify the person who is speaking. As yet another example, the article identification module 205 may identify a topic associated with an article by parsing the article into individual words or phrases and by providing the words/phrases and their context to a machine-learning model. In this example, the machine-learning model may be trained to identify topics that may be associated with articles based on a training set of articles and the topics associated with the training set of articles. Continuing with this example, the machine-learning model may output a predicted likelihood that one or more topics are associated with the article (e.g., based on a number of times that a word or phrase associated with each topic appears in the article, based on the context in which the word/phrase appears, etc.). In the above example, the article identification module 205 may identify a topic associated with an article if the predicted likelihood that the article is associated with the topic is at least a threshold likelihood.

In some embodiments, the article identification module 205 may store (e.g., as shown in step 310 of FIG. 3) articles and information associated with the articles upon identifying them. In such embodiments, the article identification module 205 may store the articles and information associated with the articles in the article store 210, which is described below. The functionality of the article identification module 205 is further described below in conjunction with FIG. 3.

The article store 210 stores articles identified by the article identification module 205 in conjunction with various types of information associated with the articles. In some embodiments, the articles and information associated with the articles may be stored in a database in the article store 210. For example, the content of the articles may be stored as CLOBs in a column of a database table while information associated with the articles (e.g., authors, distributors, sources, etc.) may be stored (e.g., in a variable character field) in other columns, such that each record in the database table corresponds to a different article. The article store 210 is further described below in conjunction with FIG. 3.

The extraction module 215 extracts (e.g., as shown in step 315 of FIG. 3) embeddings for articles. The extraction module 215 may extract embeddings for articles by mapping the text of the articles and other information associated with the articles to a set of vectors. In some embodiments, the mapping may be performed by the extraction module 215 using natural language processing (NLP) and/or a machine-learning model. For example, the extraction module 215 may use NLP on the text of an article and other information associated with the article (e.g., author, publisher, etc.), such that each word, name, and/or phrase in the article and/or associated with the article is identified. In this example, the extraction module 215 uses a machine-learning model trained to map the identified words, names, and/or phrases to vectors of real numbers in N dimensions based on their context (e.g., using 2Vec methodologies), such that relationships between the words, names, and/or phrases are indicated by the values of dimensions of the vectors to which they are mapped and distances between the vectors. Continuing with this example, the embeddings for the article correspond to the mappings, which subsequently may be used for various purposes (e.g., to determine relationships between the article and other articles). In various embodiments, once the embeddings for the articles have been extracted, the embeddings may be stored (e.g., as shown in step 320 of FIG. 3). In some embodiments, the embeddings may be stored in association with the articles (e.g., in the article store 210). The functionality of the extraction module 215 is further described below in conjunction with FIG. 3.

The category determination module 220 may determine one or more categories that may be associated with an article. Examples of categories that may be associated with an article include one or more stories and one or more types of information associated with the article (e.g., an author of the article, a distributor of the content of the article, a fact, a topic, or an entity described in the article, etc. identified by the article identification module 205). For example, an article about a protest may be associated with categories including the topic of the protest, entities involved in the protest, a story about a social movement associated with the protest, and a location and a time at which the protest took place. In some embodiments, some or all of the categories that may be associated with an article may be ordered based on a degree of specificity associated with the categories. In the above example, the story about the social movement may be the most general category associated with the article, followed by the topic of the protest, followed by details of the protest (e.g., the entities involved in the protest and the location and time at which the protest took place). The functionality of the category determination module 220 is further described below in conjunction with FIG. 3.

The graph generator 225 generates (e.g., as shown in step 325 of FIG. 3) nodes of a graph, in which each node corresponds to an article or information associated with an article. For example, if an article is associated with an author, a publisher, a distributor, and a topic, the graph generator 225 may generate five nodes of a graph, in which a first node corresponds to the article, a second node corresponds to the author, a third node corresponds to the publisher, a fourth node corresponds to the distributor, and a fifth node corresponds to the topic. Alternatively, in the above example, the graph generator 225 may generate one node of the graph, in which the node corresponds to the article. In this example, information identifying the author, publisher, distributor, and topic may be stored in association with the node.

The graph generator 225 also generates (e.g., as shown in step 335 of FIG. 3) additional nodes that are added to the existing nodes of a graph and/or edges indicating relationships among existing nodes of the graph. Each additional node may indicate relationships among existing nodes of a graph based on one or more edges connecting the existing nodes to the additional node. In some embodiments, each additional node may correspond to a fact associated with an article or any other types of information that may be associated with an article (e.g., a sentiment polarity). For example, if an article is associated with a fact that relates to an entity and a location, the graph generator 225 may generate an additional node corresponding to the fact, in which the additional node is connected by an edge to an existing node corresponding to the entity and to another existing node corresponding to the location. In various embodiments, information describing relationships between nodes may be stored in association with edges connecting the nodes. In the above example, information stored in association with the edge connecting the additional node corresponding to the fact and the existing node corresponding to the entity may describe the relationship between the fact and the entity (e.g., the fact is about the entity, the fact was included in a quote by the entity, a time at which the article describing the relationship between the fact and the entity was published, etc.).

In some embodiments, a graph generated by the graph generator 225 may be a hierarchical graph containing multiple levels of nodes. In such embodiments, different levels may correspond to different categories that may be associated with articles (e.g., categories determined by the category determination module 220), in which the levels are arranged in order of increasing specificity. For example, suppose that a graph includes several nodes arranged in hierarchical levels, in which nodes at the highest level correspond to a most general category and nodes at the lowest level correspond to a most specific category. In this example, nodes at the highest level may correspond to a comprehensive story category, such that a node at this level may correspond to a particular comprehensive story (e.g., a presidential election). Continuing with this example, nodes at a lower level may correspond to a story category, such that a node at this level that is connected by an edge to the node corresponding to the comprehensive story category may correspond to a particular story associated with the comprehensive story (e.g., a story about a presidential candidate). In the above example, nodes at an even lower level may correspond to an article category, such that a node at this level that is connected by an edge to the node corresponding to the story category may correspond to a particular article associated with the story (e.g., an article covering the story about the presidential candidate).

In some embodiments, a graph generated by the graph generator 225 may contain an arbitrary number of levels. In the above example, the graph may include multiple levels corresponding to a comprehensive story category, such that the node corresponding to the story about the presidential candidate may be connected indirectly to a node corresponding to an additional comprehensive story that is more comprehensive than the presidential election. Furthermore, in the above example, the graph also may include multiple levels corresponding to categories more specific than the article category, such as categories of subjects that may be described in an article or categories of information that may be associated with an article. In this example, the node corresponding to the article may be connected either directly or indirectly to several nodes corresponding to different categories of subjects described in the article (e.g., entities and objects) and/or different categories of information associated with the article (e.g., an author, a publisher, a distributor, etc.).

In some embodiments, the graph generator 225 may store and/or update (e.g., as shown in step 340 of FIG. 3) a graph (e.g., in the graph store 230, described below). For example, upon generating a graph, the graph generator 225 may store information associated with each node (e.g., information identifying an article corresponding to the node or information associated with the article corresponding to the node). In the above example, upon generating each additional node of the graph, the graph generator 225 may update the graph with information identifying a fact or other type of information associated with the additional node, information describing one or more relationships indicated by the additional node (e.g., information identifying existing nodes to which the additional node is connected and information stored in association with edges connecting the additional node to existing nodes), etc. In some embodiments, the graph generator 225 may update a graph without generating an additional node of the graph. For example, suppose that the article identification module 205 identifies an article that was written anonymously and the graph generator 225 generates a node of a graph corresponding to the article and stores the graph. In this example, if the article identification module 205 subsequently identifies the article again, but the article now includes an author for which the graph generator 225 previously generated a node (e.g., based on other articles written by the author identified by the article identification module 205), the graph generator 225 may update the graph by generating an edge connecting the node corresponding to the author to the node corresponding to the article and by storing information describing the edge. The functionality of the graph generator 225 is further described below in conjunction with FIGS. 3 and 4.

As briefly described above, the graph store 230 stores one or more graphs generated or updated by the graph generator 225. In embodiments in which the graph store 230 stores multiple graphs, each graph may be associated with nodes corresponding to different types or combinations of categories that may be associated with articles and information describing the relationships among the nodes. For example, the graph store 230 may store a graph including nodes corresponding to categories associated with the content of various articles (e.g., comprehensive stories, stories, articles, entities described in the articles) and edges describing relationships among the nodes. In this example, the graph store 230 also may store an additional graph including nodes corresponding to categories of information associated with various articles (e.g., author, publisher, distributor, etc.) and edges describing relationships among the nodes. The graph store 230 is further described below in conjunction with FIG. 3.

The relationship determination module 235 determines (e.g., as shown in step 330 of FIG. 3) relationships among nodes of a graph. The relationship determination module 235 may determine relationships among nodes of a graph based on information stored in the article store 210 and/or the graph store 230. For example, the relationship determination module 235 may access the graph store 230 and identify two nodes of a graph, in which one node corresponds to a particular article and another node corresponds to an entity. In this example, the relationship determination module 235 may then access the article store 210 and retrieve information associated with the article (e.g., the content of the article, an author of the article, etc.). Continuing with this example, the relationship determination module 235 may determine one or more relationships between the article and the entity based on the retrieved information (e.g., by determining whether the entity is mentioned in the article, by determining whether the entity is the author or publisher of the article, etc.).

In some embodiments, the relationship determination module 235 may determine relationships among nodes of a graph based on embeddings for one or more articles extracted by the extraction module 215 (e.g., using a machine-learning model). For example, based on embeddings for an article extracted by the extraction module 215, the relationship determination module 235 may use a machine-learning model to predict a likelihood that a relationship between the article and a particular topic exists. In this example, the relationship determination module 235 may determine whether the relationship exists by comparing the likelihood to a threshold likelihood, such that the relationship determination module 235 may determine that the relationship exists if the likelihood is at least the threshold likelihood. Once the relationship determination module 235 has determined a relationship among a set of nodes of a graph, the relationship determination module 235 may communicate this information to the graph generator 225, which may generate one or more additional nodes and/or edges in the graph describing the relationship. The functionality of the relationship determination module 235 is further described below in conjunction with FIG. 3.

The machine-learning module 240 may train one or more machine-learning models to extract embeddings for articles by mapping words, names, and/or phrases included in and/or associated with articles to vectors of real numbers in N dimensions based on their context (e.g., using 2Vec methodologies). In such embodiments, relationships between the words, names, and/or phrases are indicated by the values of the dimensions of the vectors to which they are mapped and/or by the distances between the vectors, such that the machine-learning model(s) may predict a level of similarity or dissimilarity between the words, names, and/or phrases based on the vectors. For example, a machine-learning model may predict that words or phrases corresponding to vectors that are closer together are more similar than vectors corresponding to words or phrases corresponding to vectors that are farther apart. Similarly, the model(s) may be used to predict a level of similarity or dissimilarity between articles based on the values of the dimensions of vectors mapped to words or phrases included in the articles and/or based on distances between the vectors. In some embodiments, a machine-learning model used to extract the embeddings may be retrained (e.g., periodically or each time a new set of articles is identified by the article identification module 205).

The machine-learning module 240 also may train one or more machine-learning models to predict various types of information associated with articles. In some embodiments, the machine-learning module 240 may train a machine-learning model to predict a likelihood that an article contains factual reporting. For example, the machine-learning module 240 may train a machine-learning model using keywords and phrases parsed from a training set of articles. In this example, some of the articles included in the training set may contain factual reporting and have been classified to indicate that they contain factual reporting. Similarly, in this example, some of the articles included in the training set may not contain factual reporting and have been classified to indicate that they do not contain factual reporting. Continuing with this example, once trained, the machine-learning model may receive a set of inputs including keywords/phrases that are parsed from the content of an article. In the above example, based on the set of inputs, the machine-learning model may then output a predicted likelihood that the article contains factual reporting.

In various embodiments, the machine-learning module 240 may train a machine-learning model to predict a likelihood that an article is associated with various types of information (e.g., a topic or a subject). For example, the machine-learning module 240 may train a machine-learning model using keywords and phrases parsed from a training set of articles that have been classified to indicate that they are associated with various topics. In this example, once trained, the machine-learning model may receive a set of inputs including keywords/phrases that are parsed from the content of an article. Continuing with this example, the machine-learning model may then output a predicted likelihood that the article is associated with a particular topic.

In some embodiments, one or more machine-learning models may be trained by the machine-learning module 240 to predict a level of trustworthiness associated with an article. For example, the machine-learning module 240 may train a machine-learning model to predict a level of trustworthiness of an author, a source, a distributor, or a publisher of an article. The machine-learning module 240 may train a model based on historical information associated with various articles or based on any other suitable types of information. For example, the machine-learning module 240 may train a model to predict a level of trustworthiness associated with an article based on a set of training data associated with articles that have been fact-checked. In this example, the training data may include historical information that may indicate the accuracy of the articles (e.g., based on whether the articles have been flagged as being inaccurate or have been redacted). In the above example, the historical information also may indicate the accuracy of the articles based on a number of individuals who have expressed a preference for the articles and/or who have shared the articles (e.g., via social networking systems), etc.

In some embodiments, the machine-learning module 240 also may train one or more machine-learning models to predict a likelihood that an article contains editorial content. In such embodiments, the machine-learning module 240 may train a model to identify words or phrases that indicate that statements in which the words or phrases appear are opinions. For example, the machine-learning module 240 may train a model to identify editorial content based on a set of training data that identify words or phrases that frequently appear in statements that express an opinion (e.g., words that criticize or praise an entity, such as "good" or "bad," "wrong" or "right," "I believe . . . ," "In my opinion . . . ," etc.). Based on the numbers of words or phrases identified by a model included in an article indicating that the article contains editorial content, the model may predict a likelihood that the article contains editorial content. In some embodiments, a model also may be trained to identify non-editorial content based on a set of training data that identifies words or phrases that frequently appear in statements that are verifiable (e.g., phrases including statistics or other measurable quantities, dates or locations of events, etc.). In such embodiments, a model also may predict a likelihood that an article contains editorial content based on any non-editorial content it identifies in the article. For example, a model may predict a likelihood that an article contains editorial content based on a ratio of a number of words or phrases indicating the article contains editorial content to a number of words or phrases indicating the article contains non-editorial content.

In some embodiments, the machine-learning module 240 also may train one or more machine-learning models to predict a likelihood that an article is biased or includes content having a particular sentiment polarity. In such embodiments, the machine-learning module 240 may train a model to identify words or phrases that indicate a particular sentiment about a particular topic or subject. For example, the machine-learning module 240 may train a model to identify biased content based on a set of training data that identify words or phrases that frequently appear in statements that express a negative sentiment (e.g., words that criticize an entity, such as "bad," "wrong," "horrible," "stupid," "ugly," etc.) in the context of a particular topic or subject (e.g., war, politics, etc.). In this example, the set of training data also may identify words or phrases that frequently appear in statements that express a positive sentiment (e.g., words that praise an entity, such as "good," "right," "great," "genius," beautiful," etc.) in the context of a particular topic or subject. Based on the number of words or phrases included in an article indicating that the article contains content that expresses a sentiment in the context of a particular topic or subject, the model may predict a likelihood that the article is associated with a sentiment polarity. For example, a model may predict a likelihood that an article is biased with respect to a particular topic based on a percentage of words or phrases identified by the model indicating that the article is biased, in which the words or phrases appear within the context of the topic. In some embodiments, the machine-learning module 240 also may train one or more models to predict a likelihood that an article is biased or includes content having a particular sentiment polarity based on historical information. For example, the machine-learning module 240 may train a model to predict a likelihood that an article is biased based on historical information indicating that other articles written by the same author about the same topic also are biased or which were predicted by the model to have at least a threshold likelihood of being biased.

In various embodiments, the machine-learning module 240 also may train one or more machine-learning models to predict a likelihood that an article contains a particular type of content (e.g., clickbait, potentially offensive content, etc.). In such embodiments, the machine-learning module 240 may train a model to identify words or phrases that characterize the type of content. For example, the machine-learning module 240 may train a model to identify potentially offensive content based on a set of training data that identify words or phrases that frequently appear in potentially offensive content (e.g., hate speech, expletives, etc.) as well as images that frequently appear in potentially offensive content (e.g., nudity, graphic images, etc.). As an additional example, the machine-learning module 240 may train a model to identify articles that include clickbait based on training data that includes keywords or phrases that are characteristic of clickbait (e.g., "You'll never believe what . . . " or "Click here to find out why . . . "). The functionality of the machine-learning module 240 is further described below in conjunction with FIG. 3.

The query module 245 may query (e.g., as shown in step 350 of FIG. 3) one or more graphs for various types of information (e.g., by accessing the graph store 230). For example, the query module 245 may query a graph for information identifying articles written by a particular author, published by a particular publisher, distributed by a particular distributor, or containing particular content (e.g., articles containing specific quotes or objectionable content, articles mentioning particular topics, subjects, entities, objects, locations, events, times, facts, etc.). As an additional example, the query module 245 may query a graph for information identifying every version of an article or for information identifying every story associated with the article. In various embodiments, the query module 245 may query a graph for different combinations of information associated with one or more articles. For example, the query module 245 may query a graph for information identifying articles obtained from a particular source and which mention a particular entity, in which the articles indicate a positive or negative sentiment towards the entity. As an additional example, the query module 245 may query a graph for information identifying all stories connected either directly or indirectly to one or more comprehensive stories that were published before a particular date and which do not mention a particular subject.

In some embodiments, the query module 245 may query a graph in response to receiving a request for information received from a user of the online system 140 (e.g., via a user interface generated by the user interface module 250, described below). In such embodiments, the query module 245 may query a graph based at least in part on the request (e.g., based on an author identified in the request, based on a topic identified in the request, based on a type of relationship among articles identified in the request, etc.). Furthermore, in such embodiments, the query module 245 also may query a graph using a machine-learning model. For example, in response to receiving a request to determine the trustworthiness of an author, the query module 245 may use a machine-learning model to query the graph and predict a level of trustworthiness of the author based on historical information (e.g., based on whether statements included in articles written by the author are contradicted by or corroborated by statements included in a majority of articles that were written at around the same time). As an additional example, in response to receiving a request to identify surprising developments in a story, the query module 245 may use a machine-learning model to query a graph and identify recent articles associated with the story that are associated with at least a threshold measure of trustworthiness and which contain statements that contradict a majority of statements in older articles associated with the same story, but which also are associated with at least a threshold measure of trustworthiness. As another example, in response to receiving a request to identify articles that are likely to contain editorial content, the query module 245 may use a machine-learning model to query a graph and identify articles that include statements expressing opinions about topics. As an additional example, in response to receiving a request to identify articles that are likely to be biased, the query module 245 may use a machine-learning model to query a graph and identify articles written by authors who consistently have expressed a positive or negative sentiment with regard to the same topic or subject. As yet another example, in response to receiving a request to identify duplicate or similar articles, the query module 245 may use a machine-learning model to query a graph and identify articles having at least a threshold measure of similarity to each other based on embeddings for the articles.

In some embodiments, the query module 245 also may query a graph in response to receiving a request to perform an action received from a user of the online system 140 (e.g., via a user interface generated by the user interface module 250). In such embodiments, the query module 245 also may query a graph based at least in part on the request using a machine-learning model and may perform (e.g., as shown in step 355 of FIG. 3) the requested action based on one or more query results. For example, suppose that the online system 140 receives a request to generate a summary for similar articles and to replace any of the headlines of the articles that contain clickbait with the summary. In this example, the query module 245 may use a machine-learning model to query a graph and identify articles having at least a threshold measure of similarity to each other and basic information included in the articles (e.g., who, what, when, where, and how/why). In this example, the query module 245 may use the machine-learning model to identify the articles having titles that include keywords or phrases that are characteristic of clickbait (e.g., "You'll never believe what . . . "). Continuing with this example, the query module 245 may then generate a summary based on the basic information identified by the machine-learning model and replace the headlines of the articles containing clickbait with the summary. As an additional example, in response to receiving a request to assign citations or sources to statements included in an article, the query module 245 may use a machine-learning model to query a graph and identify articles containing the same statements, in which the articles include citations or sources assigned to those statements and are associated with at least a threshold level of trustworthiness. In this example, the query module 245 may assign the citations/sources in the identified articles to the statements included in the article specified in the request. As yet another example, suppose that the online system 140 receives a request to unblock articles that are newsworthy, but unintentionally have been blocked because they contain potentially offensive images (e.g., images of victims of war). In this example, the query module 245 may use a machine-learning model to query a graph and identify articles containing such images that have been blocked, but which are likely to be newsworthy (e.g., articles having sources including television news channels, radio news stations, etc. that are associated with at least a threshold likelihood of being trustworthy). Continuing with this example, the query module 245 may then unblock the identified articles (e.g., from being included in a newsfeed presented to online system users). The functionality of the query module 245 is further described below in conjunction with FIG. 3.

The user interface module 250 may generate a user interface used to receive (e.g., as shown in step 345) requests from users of the online system 140 (e.g., to query one or more graphs or to perform one or more actions). The user interface may include a text field, radio buttons, a drop-down menu, or any other type of interactive element suitable for receiving a request from a user of the online system 140. For example, the user interface may include a text field that may receive a query in the form of a string including one or more Boolean operators. As an additional example, the user interface may include a drop-down menu of actions that a user may request to be performed by the online system 140.

The user interface module 250 also may generate a user interface used to display (e.g., as shown in step 360 of FIG. 3) results of requests received from users of the online system 140. The user interface may present one or more results in a list format, in a table format, or in any other suitable format. For example, in response to receiving a query for information identifying all articles about a particular story, the user interface module 250 may generate a user interface including a table, in which one column of the table identifies the titles of the articles, another column identifies the authors of the articles, another column identifies the date of publication of the articles, etc. In some embodiments, the user interface also may include one or more interactive elements that allow the results to be manipulated. In the above example, the table may have a sort feature that allows the articles to be sorted alphabetically by author name, chronologically by publication date, etc.

In some embodiments, a user interface generated by the user interface module 250 may include a feed of information that displays a result of performing a requested action. For example, the user interface module 250 may generate a newsfeed associated with a user of the online system 140 in response to receiving a request to present content to the user (e.g., in response to receiving information indicating that the user has logged into a user account maintained in the online system 140 associated with the user). In this example, the newsfeed may highlight contradicting articles in the feed that are associated with content for which the user recently searched in the online system 140. The functionality of the user interface module 250 is further described below in conjunction with FIG. 3.

The web server 255 links the online system 140 via the network 120 to the one or more client devices 110, as well as to the one or more third-party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Figure 3:
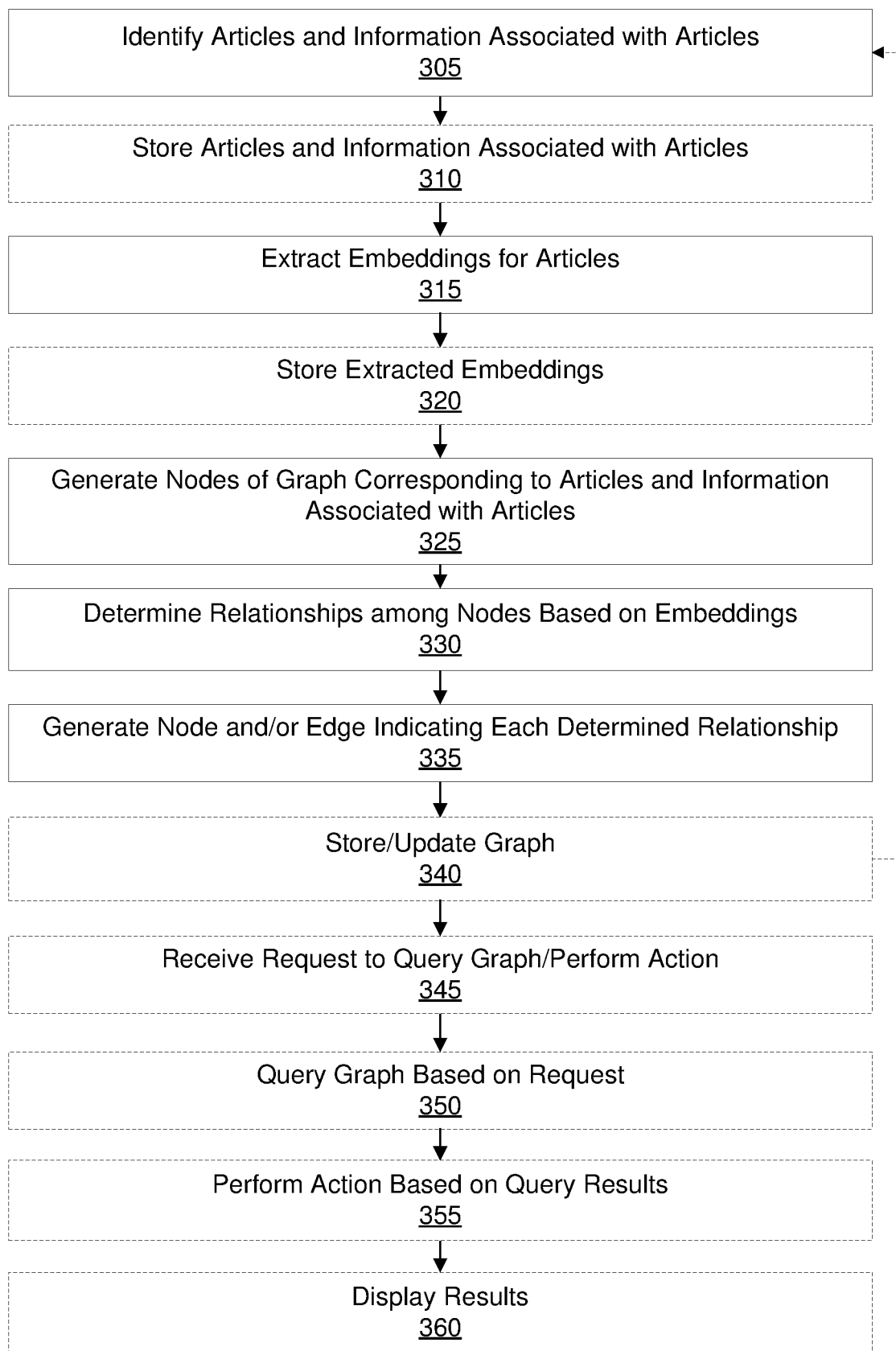
FIG. 3 is a flow chart of a method for generating a graphical representation of relationships among a set of articles and information associated with the set of articles, in accordance with an embodiment.

Generating a Graphical Representation of Relationships Among Articles and Information Associated with the Articles FIG. 3 is a flow chart of a method for generating a graphical representation of relationships among a set of articles and information associated with the set of articles, in accordance with an embodiment. In other embodiments, the method may include different and/or additional steps than those shown in FIG. 3. Additionally, steps of the method may be performed in a different order than the order described in conjunction with FIG. 3.

The online system 140 identifies (in step 305, e.g., using the article identification module 205) articles (e.g., news articles) containing factual reporting (i.e., articles asserting or otherwise associated with one or more facts). The content of articles identified 305 by the online system 140 may be expressed in various formats (e.g., text, audio, video, images, etc.) and communicated via various types of media (e.g., newspapers, magazines, radio, television, the Internet, etc.). In embodiments in which the content of an article identified by the online system 140 is expressed in a format other than text, the online system 140 may identify 305 the article with the aid of various types of technology and/or interpretation methods (e.g., automatic transcription technology, lip reading technology, facial recognition technology, etc.). In some embodiments, the online system 140 may identify 305 the articles using one or more machine-learning models trained (e.g., using the machine-learning module 240) to predict likelihoods that the articles contain factual reporting (e.g., by parsing the content of the articles, identifying keywords, phrases, and/or contextual information included in the articles, and providing the keywords/phrases and contextual information to the machine-learning model (s)).

The online system 140 also identifies 305 (e.g., using the article identification module 205) information associated with the articles. Examples of information associated with the articles include their authors, publishers, distributors (e.g., television channels, radio stations, etc.), titles (e.g., headlines), content, versions, sources, etc. Information associated with the articles also may include stories, facts, subjects, topics, sentiment polarities, objects, locations, times, and any other types of information that may be associated with their content. The online system 140 may identify 305 information associated with the articles using various techniques or combinations of techniques (e.g., keywords or phrases included in the articles, lip reading technology, facial recognition technology, etc.). The online system 140 also may identify 305 information associated with the articles using a machine-learning model (e.g., by parsing the articles into individual words or phrases and by providing the words/phrases and their context to a machine-learning model that is trained to identify topics or other types of information that may be associated with the articles). In some embodiments, the online system 140 may store 310 (e.g., using the article identification module 205) the articles and information associated with the articles upon identifying 305 them (e.g., in a database in the article store 210).

Once the online system 140 has identified 305 the articles and information associated with the articles, the online system 140 may extract 315 (e.g., using the extraction module 215) embeddings (e.g., word embeddings or phrase embeddings) for the articles based at least in part on the information associated with the articles. The online system 140 may extract (in step 315) embeddings for the articles by mapping the text of the articles and other information associated with the articles to a set of vectors. In some embodiments, the mapping may be performed by the online system 140 using natural language processing (NLP) and/or a machine-learning model. In various embodiments, once the embeddings for the articles have been extracted 315, the embeddings may be stored 320 (e.g., in association with the articles in the article store 210).

The online system 140 then generates 325 (e.g., using the graph generator 225) a set of nodes of a graph, in which each node corresponds to an article or information associated with an article. In some embodiments, the nodes may be associated with different categories determined by the online system 140 (e.g., using the category determination module 220) that may be associated with an article. Examples of categories that may be associated with an article include one or more stories associated with the article, an author of the article, a distributor of the content of the article, a fact, a topic, or an entity described in the article, etc. In some embodiments, some or all of the categories that may be associated with the nodes may be ordered based on a degree of specificity associated with the categories.

The online system 140 then determines (in step 330, e.g., using the relationship determination module 235) relationships among the set of nodes using the embeddings and/or based on other information stored in the online system 140 (e.g., in the article store 210 and/or the graph store 230). In some embodiments, the online system 140 may determine (in step 330) relationships among nodes of a graph based on the embeddings (e.g., using a machine-learning model). Once the online system 140 has determined 330 one or more relationships among nodes of the graph, the online system 140 generates 335 (e.g., using the graph generator 225) an additional set of nodes that are added to the existing nodes of the graph, in which the additional set of nodes indicate the relationships determined 330 by the online system 140 (e.g., based on one or more edges connecting existing nodes to each additional node). Each of the additional set of nodes may correspond to a fact associated with an article or any other types of information that may be associated with an article (e.g., a sentiment polarity). In various embodiments, information describing relationships between nodes may be stored in association with edges connecting the nodes.

Figure 4:
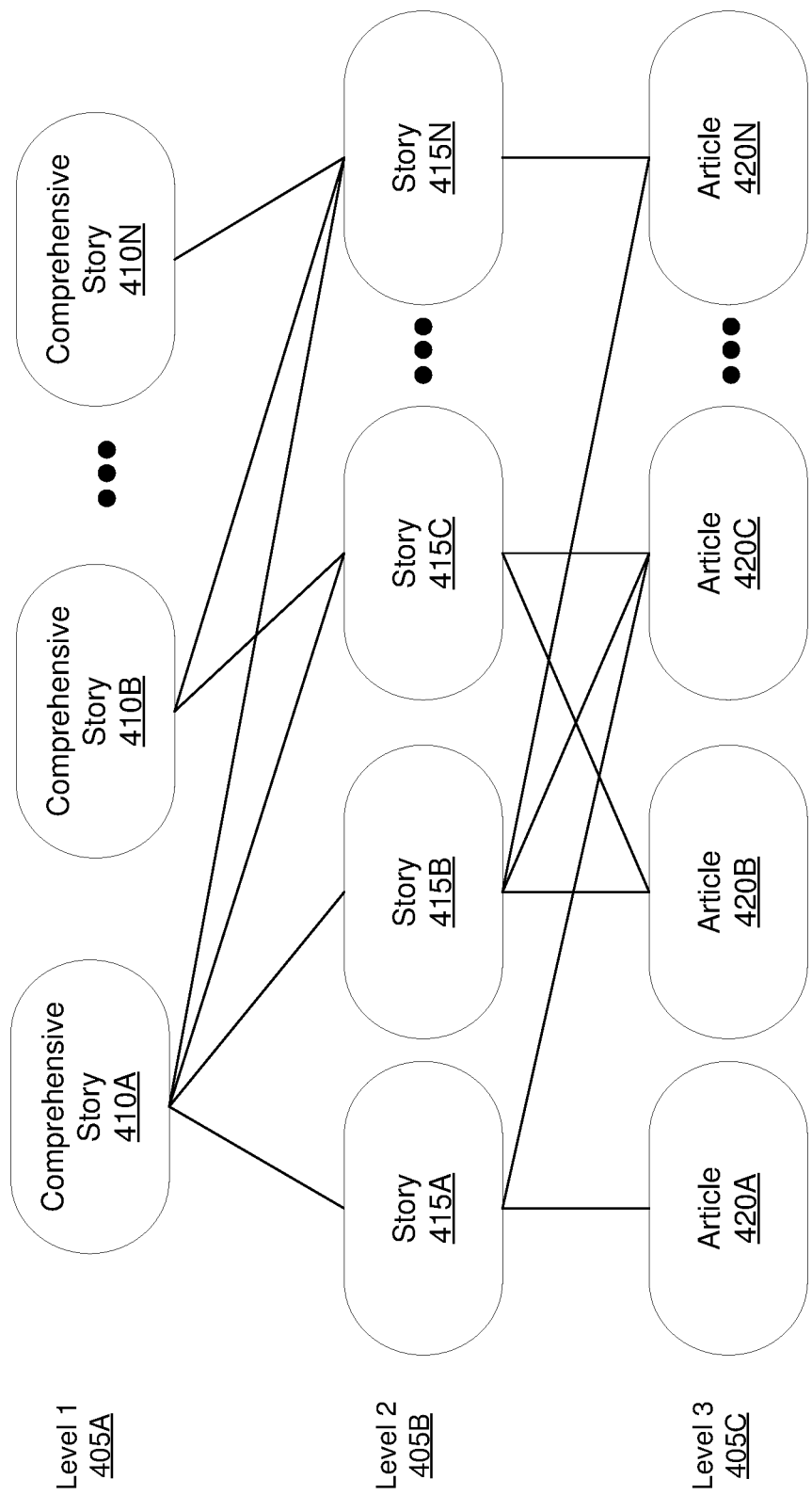
FIG. 4 is a conceptual diagram of a graphical representation of relationships among a set of articles and information associated with the set of articles, in accordance with an embodiment.

In embodiments in which the nodes are associated with different categories determined by the online system 140, the graph may be a hierarchical graph containing multiple levels of nodes. In such embodiments, different levels may correspond to different categories that may be associated with the articles, in which the levels are arranged in order of increasing specificity. As shown in the example of FIG. 4, a graph 400 may include three levels 405A-C, in which a highest level (Level 1 405A) corresponds to a most general comprehensive story category, such that a node 410A-N at this level may correspond to a particular comprehensive story (e.g., new mobile devices introduced at a convention). Continuing with this example, a lower level (Level 2 405B) may correspond to a story category, such that each node 415A-N at this level that is connected by an edge to a node 410A-N corresponding to the comprehensive story category may correspond to a particular story associated with the comprehensive story (e.g., a story about a particular new mobile device introduced at the convention). In the above example, an even lower level (Level 3 405C) may correspond to an article category, such that a node 420A-N at this level that is connected by an edge to a node 415A-N corresponding to the story category may correspond to a particular article associated with the story (e.g., an article covering the story about the particular new mobile device introduced at the convention). Although the graph 400 depicted in FIG. 4 only includes three levels 405A-C, in some embodiments, the graph 400 may contain an arbitrary number of levels 405 (e.g., additional levels 405 corresponding to stories that are more comprehensive than the comprehensive story category corresponding to Level 1 405A).

Referring back to FIG. 3, in some embodiments, once the graph is generated, the online system 140 may store 340 (e.g., using the graph generator 225) the graph (e.g., in the graph store 230). In embodiments in which the online system 140 stores 340 multiple graphs, each graph may be associated with nodes corresponding to different types or combinations of categories that may be associated with articles and information describing the relationships among the nodes. The online system 140 also may update 340 (e.g., using the graph generator 225) the graph by repeating some of the steps described above (e.g., by proceeding back to the identifying (in step 305) articles and information associated with the articles step, etc.). In some embodiments, the online system 140 may update the graph without generating 335 an additional node of the graph (e.g., by generating 335 edges describing relationships among existing nodes).

The online system 140 may receive 345 a request from a user of the online system 140. In some embodiments, the request may be received 345 via a user interface generated by the online system 140 (e.g., using the user interface module 250). The user interface may include a text field, radio buttons, a drop-down menu, or any other type of interactive element suitable for receiving a request from a user of the online system 140. In various embodiments, the request may correspond to a request to query one or more graphs for various types of information. For example, the online system 140 may receive 345 a request to query one or more graphs for information identifying all publishers that published articles alleging a fact, information identifying articles containing editorialized content or clickbait, etc. In other embodiments, the request may correspond to a request to perform an action. For example, the online system 140 may receive 345 a request to assign citations or sources to statements included in an article.

In response to receiving 345 a request to query one or more graphs and/or to perform an action, the online system 140 may query 350 (e.g., using the query module 245) one or more graphs. In some embodiments, the online system 140 may do so by accessing the graph store 230 and querying 350 one or more graphs for various types of information based at least in part on the request (e.g., based on an author identified in the request, based on a topic identified in the request, based on a type of relationship among articles identified in the request, etc.). The online system 140 also may query 350 one or more graphs to perform an action specified in the request. For example, the online system 140 may query 350 a graph to identify and remove similar articles from a feed to be presented to a user of the online system 140 or to highlight contradicting articles in the feed. In some embodiments, the online system 140 also may query 350 a graph using a machine-learning model trained by the online system 140 (e.g., using the machine-learning module 240). For example, the online system 140 may query 350 a graph using a machine-learning model to identify articles having at least a threshold measure of similarity to each other based on embeddings for the articles.

In embodiments in which the online system 140 receives 345 a request to perform an action, the online system 140 may perform 355 (e.g., using the query module 245) the requested action based on one or more query results. For example, if the online system 140 receives 345 a request to generate a summary for similar articles and to replace any of the headlines of the articles that contain clickbait with the summary, the online system 140 may use a machine-learning model to query 350 a graph and identify articles having at least a threshold measure of similarity to each other, generate a summary for these articles, identify the articles having titles that include keywords or phrases that are characteristic of clickbait, and replace the headlines of the articles containing clickbait with the summary. As an additional example, in response to receiving 345 a request to assign citations or sources to statements included in an article, the online system 140 may use a machine-learning model to query 350 a graph and identify articles containing the same statements, in which the articles include citations or sources assigned to those statements and are associated with at least a threshold level of trustworthiness. In this example, the online system 140 may assign the citations/sources in the identified articles to the statements included in the article specified in the request.

Once the online system 140 has queried 350 one or more graphs and/or has performed 355 an action based on one or more query results, the online system 140 may display 360 a set of results (e.g., query results and/or results of performing the action). In some embodiments, the online system 140 may display 360 the results by generating (e.g., using the user interface module 250) a user interface including the results and by sending the user interface for display to a client device 110 associated with a user of the online system 140. The user interface may present one or more query results in a list format, in a table format, or in any other suitable format. In some embodiments, the user interface also may include one or more interactive elements that allow the query results to be manipulated (e.g., so that they may be sorted by date). In various embodiments, the user interface may include a feed of information that displays 360 a result of performing a requested action (e.g., a newsfeed that highlights articles describing surprising developments in a story for which the user recently searched in the online system 140).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    identifying, at an online system, a plurality of articles and a set of information associated with the plurality of articles, the plurality of articles identified based at least in part on one or more facts associated with each of the plurality of articles, the set of information associated with the plurality of articles comprising one or more selected from the group consisting of: an author of an article, a publisher of the article, a distributor of a content of the article, information describing the content of the article, a title of the article, a version of the article, a story associated with the article, a topic of the article, a subject described in the article, an entity described in the article, an object described in the article, a time associated with the article, a location associated with the article, a fact associated with the article, a sentiment polarity associated with the article, a source of the article, and any combination thereof;
    extracting a plurality of embeddings for the plurality of articles based at least in part on the set of information associated with the plurality of articles;
    generating a set of nodes comprising a graph, each of the set of nodes corresponding to an article of the plurality of articles or a subset of the set of information associated with the plurality of articles; and
    for each of the one or more facts associated with each of the plurality of articles:
        determining a relationship among a subset of the set of nodes comprising the graph based at least in part on the plurality of embeddings, and
        generating a node having one or more edges indicating the determined relationship among the subset of the set of nodes comprising the graph, the node added to the set of nodes comprising the graph.

2. The method of claim 1, wherein a content of the plurality of articles is expressed in one or more types of formats selected from the group consisting of: text, audio, image, video, and any combination thereof.

3. The method of claim 1, wherein the sentiment polarity associated with the article is selected from the group consisting of: positive, negative, and neutral.

4. The method of claim 1, wherein extracting the plurality of embeddings for the plurality of articles comprises:
    mapping a set of words included among the set of information associated with the plurality of articles to a set of vectors of real numbers using a machine-learning model.

5. The method of claim 4, wherein the relationship among the subset of the set of nodes comprising the graph is determined based at least in part on one or more of: a set of values of one or more dimensions of the set of vectors and one or more distances between the set of vectors.

6. The method of claim 1, further comprising:
    querying the graph based at least in part on a request received from a user of the online system; and
    determining a result of the query based at least in part on the relationship among the subset of the set of nodes comprising the graph.

7. The method of claim 6, wherein the request specifies one or more selected from the group consisting of: editorial content, clickbait, one or more statements that contradict a particular statement, one or more statements that corroborate the particular statement, bias, objectionable content, a common subset of the set of information associated with the plurality of articles, content that is trustworthy, content that is not trustworthy.

8. The method of claim 6, wherein the result of the query identifies a set of the plurality of articles having at least a threshold measure of similarity to each other.

9. The method of claim 8, further comprising:
    generating a summary describing the set of the plurality of articles having at least the threshold measure of similarity to each other.

10. The method of claim 1, wherein the graph comprises a plurality of levels arranged in order of increasing specificity, each of the plurality of levels corresponding to a category associated with each of the set of nodes.

11. The method of claim 10, wherein the category is selected from the group consisting of: an article, a story, and a comprehensive story.

12. A computer program product comprising a computer readable storage medium having instructions encoded thereon that, when executed by a processor, cause the processor to:
    identify, at an online system, a plurality of articles and a set of information associated with the plurality of articles, the plurality of articles identified based at least in part on one or more facts associated with each of the plurality of articles, the set of information associated with the plurality of articles comprising one or more selected from the group consisting of: an author of an article, a publisher of the article, a distributor of a content of the article, information describing the content of the article, a title of the article, a version of the article, a story associated with the article, a topic of the article, a subject described in the article, an entity described in the article, an object described in the article, a time associated with the article, a location associated with the article, a fact associated with the article, a sentiment polarity associated with the article, a source of the article, and any combination thereof;

extract a plurality of embeddings for the plurality of articles based at least in part on the set of information associated with the plurality of articles;

generate a set of nodes comprising a graph, each of the set of nodes corresponding to an article of the plurality of articles or a subset of the set of information associated with the plurality of articles; and for each of the one or more facts associated with each of the plurality of articles:

determine a relationship among a subset of the set of nodes comprising the graph based at least in part on the plurality of embeddings, and generate a node having one or more edges indicating the determined relationship among the subset of the set of nodes comprising the graph, the node added to the set of nodes comprising the graph.

13. The computer program product of claim 12, wherein a content of the plurality of articles is expressed in one or more types of formats selected from the group consisting of: text, audio, image, video, and any combination thereof.

14. The computer program product of claim 12, wherein the sentiment polarity associated with the article is selected from the group consisting of: positive, negative, and neutral.

15. The computer program product of claim 12, wherein extract the plurality of embeddings for the plurality of articles comprises:

map a set of words included among the set of information associated with the plurality of articles to a set of vectors of real numbers using a machine-learning model.

16. The computer program product of claim 15, wherein the relationship among the subset of the set of nodes comprising the graph is determined based at least in part on one or more of: a set of values of one or more dimensions of the set of vectors and one or more distances between the set of vectors.

17. The computer program product of claim 12, wherein the computer readable storage medium further has instructions encoded thereon that, when executed by the processor, cause the processor to:

query the graph based at least in part on a request received from a user of the online system; and determine a result of the query based at least in part on the relationship among the subset of the set of nodes comprising the graph.

18. The computer program product of claim 17, wherein the request specifies one or more selected from the group consisting of: editorial content, clickbait, one or more statements that contradict a particular statement, one or more statements that corroborate the particular statement, bias, objectionable content, a common subset of the set of information associated with the plurality of articles, content that is trustworthy, content that is not trustworthy.

19. The computer program product of claim 17, wherein the result of the query identifies a set of the plurality of articles having at least a threshold measure of similarity to each other.

20. The computer program product of claim 19, wherein the computer readable storage medium further has instructions encoded thereon that, when executed by the processor, cause the processor to:

generate a summary describing the set of the plurality of articles having at least the threshold measure of similarity to each other.

21. The computer program product of claim 12, wherein the graph comprises a plurality of levels arranged in order of increasing specificity, each of the plurality of levels corresponding to a category associated with each of the set of nodes.

22. The computer program product of claim 21, wherein the category is selected from the group consisting of: an article, a story, and a comprehensive story.

23. A method comprising:

identifying, at an online system, a plurality of articles and a set of information associated with the plurality of articles, the plurality of articles identified based at least in part on one or more facts associated with each of the plurality of articles, the set of information associated with the plurality of articles comprising one or more selected from the group consisting of: an author of an article, a publisher of the article, a distributor of a content of the article, information describing the content of the article, a title of the article, a version of the article, a story associated with the article, a topic of the article, a subject described in the article, an entity described in the article, an object described in the article, a time associated with the article, a location associated with the article, a fact associated with the article, a sentiment polarity associated with the article, a source of the article, and any combination thereof;

extracting a plurality of embeddings for the plurality of articles based at least in part on the set of information associated with the plurality of articles;

generating a set of nodes comprising a graph, each of the set of nodes corresponding to an article of the plurality of articles or a subset of the set of information associated with the plurality of articles;

determining one or more relationships among a subset of the set of nodes comprising the graph based at least in part on the plurality of embeddings; and generating an additional set of nodes, each of the additional set of nodes having one or more edges indicating each of the determined one or more relationships among the subset of the set of nodes comprising the graph, the additional set of nodes added to the set of nodes comprising the graph.

\* \* \* \* \*